US012638715B2

(12) United States Patent   (10) Patent No.: US 12,638,715 B2
Kuo et al.   (45) Date of Patent: May 26, 2026

---

(54) ELECTRONIC DEVICE

(71) Applicant: InnoLux Corporation, Miao-Li County (TW)

(72) Inventors: Chih-Chin Kuo, Miao-Li County (TW); Hsu-Kuan Hsu, Miao-Li County (TW); Tzu-Chieh Lai, Miao-Li County (TW); Mao-Shiang Lin, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 24 days.

(21) Appl. No.: 18/598,648

(22) Filed: Mar. 7, 2024

(65) Prior Publication Data

US 2024/0329459 A1   Oct. 3, 2024

Related U.S. Application Data

(60) Provisional application No. 63/493,365, filed on Mar. 31, 2023.

(30) Foreign Application Priority Data

Jan. 4, 2024   (CN) ........................ 202410012220.X

(51) Int. Cl.
　　*G02F 1/1335*　　(2006.01)
　　*G02F 1/137*　　(2006.01)
(52) U.S. Cl.
　　CPC .. *G02F 1/133536* (2013.01); *G02F 1/133502* (2013.01); *G02F 1/133514* (2013.01); *G02F 1/133531* (2021.01); *G02F 1/133553*

(2013.01); *G02F 1/137* (2013.01); *G02F 2202/04* (2013.01); *G02F 2203/055* (2013.01)

(58) Field of Classification Search
CPC ......... G02F 1/133536; G02F 1/133531; G02F 1/133502; G02F 1/133514; G02F 1/133553; G02F 1/37
See application file for complete search history.

(56) References Cited

U.S. PATENT DOCUMENTS

| | | | | |
|---|---|---|---|---|
| 6,067,135 A | * | 5/2000 | Shimizu | ................ G02F 1/1334 |
| | | | | 349/86 |
| 6,559,916 B1 | | 5/2003 | Urabe et al. | |
| 2003/0001993 A1 | * | 1/2003 | Iijima | ................ G02F 1/13362 |
| | | | | 349/113 |

(Continued)

FOREIGN PATENT DOCUMENTS

| | | |
|---|---|---|
| CN | 101644870 A | 2/2010 |
| TW | 201837577 A | 10/2018 |

*Primary Examiner* — David Y Chung

(74) *Attorney, Agent, or Firm* — MUNCY, GEISSLER, OLDS & LOWE, P.C.

(57) ABSTRACT

An electronic device includes: a light modulation medium layer including a liquid crystal material and a dye material; a reflective element disposed opposite to the light modulation medium layer and away from a display side of the electronic device; a reflective polarizing element disposed between the light modulation medium layer and the reflective element; and a polarizer disposed between the reflective polarizing element and the reflective element, wherein the reflective element has a reflectance of light with wavelengths ranging from 380 nm to 780 nm greater than or equal to 80%.

16 Claims, 8 Drawing Sheets

(56) References Cited

U.S. PATENT DOCUMENTS

| | | | |
|---|---|---|---|
| 2004/0100598 A1* | 5/2004 | Adachi | G02F 1/13362 |
| | | | 349/113 |
| 2004/0125430 A1* | 7/2004 | Kasajima | G02F 1/133536 |
| | | | 359/247 |
| 2005/0225686 A1* | 10/2005 | Brummack | G02F 1/1335 |
| | | | 349/1 |
| 2007/0097504 A1* | 5/2007 | Li | G02F 1/133536 |
| | | | 345/32 |
| 2021/0215969 A1* | 7/2021 | Sun | G02F 1/1337 |

* cited by examiner

ELECTRONIC DEVICE

CROSS-REFERENCE TO RELATED APPLICATIONS

This application claims the benefits of the Chinese Patent Application Serial Number 202410012220.X, filed on Jan. 4, 2024, the subject matter of which is incorporated herein by reference.

This application claims the benefit of filing date of U.S. Provisional Application Ser. No. 63/493,365, filed Mar. 31, 2023 under 35 USC § 119(e)(1).

BACKGROUND

Field

The present disclosure relates to an electronic device and, in particular an electronic device comprising a light modulation medium layer.

Description of Related Art

Currently, anti-glare electronic devices (such as rearview mirrors or other devices) are available on the market to reduce glare or viewing discomfort caused by glare.

However, anti-glare electronic devices on the market still have shortcomings such as poor anti-glare effect or long response time.

Therefore, it is desirable to provide an improved device to improve the aforesaid defects.

SUMMARY

The present disclosure provides an electronic device, which comprises: a light modulation medium layer comprising a liquid crystal material and a dye material; a reflective element disposed opposite to the light modulation medium layer and away from a display side of the electronic device; a reflective polarizing element disposed between the light modulation medium layer and the reflective element; and a polarizer disposed between the reflective polarizing element and the reflective element, wherein the reflective element has a reflectance of light with wavelengths ranging from 380 nm to 780 nm greater than or equal to 80%.

The present disclosure further provides another electronic device, which comprises: a light modulation medium layer comprising a liquid crystal material and a dye material; a reflective element disposed opposite to the light modulation medium layer and away from a display side of the electronic device; and a polarizer disposed between the light modulation medium layer and the reflective element, wherein the reflective element has a reflectance of light with wavelengths ranging from 380 nm to 780 nm greater than or equal to 80%, wherein when the electronic device is switched to a low reflective mode, the light modulation medium layer has a first absorption axis, and an angle included between the first absorption axis and a second absorption axis of the polarizer ranges from 80 degrees to 100 degrees.

Other novel features of the disclosure will become more apparent from the following detailed description when taken in conjunction with the accompanying drawings.

DETAILED DESCRIPTION

Figure 1A:
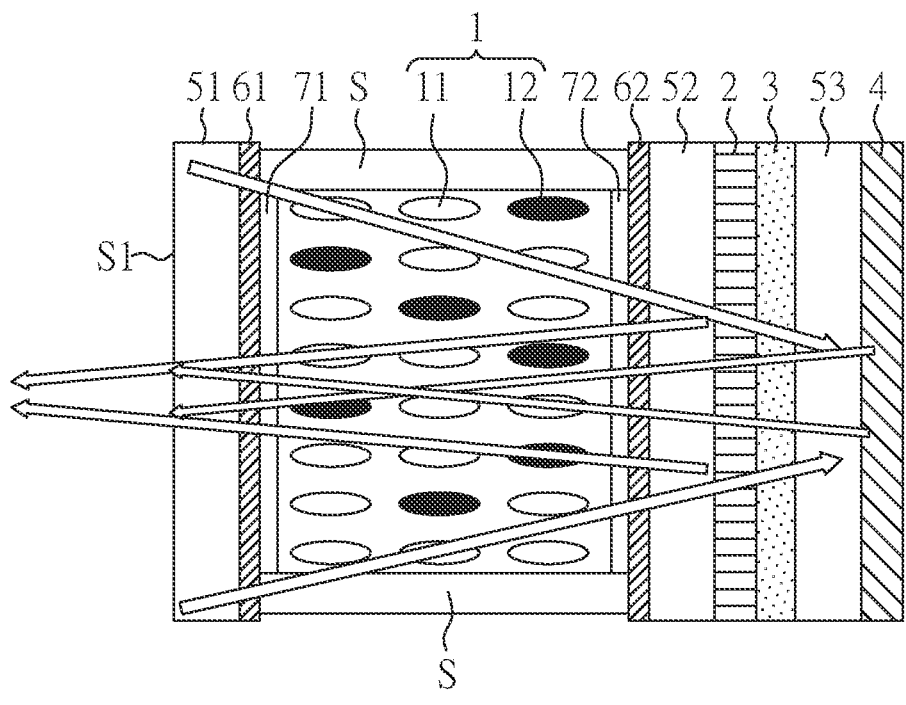
FIG. 1A is a schematic view of a high reflective mode of an electronic device according to one embodiment of the present disclosure.
Figure 1A:
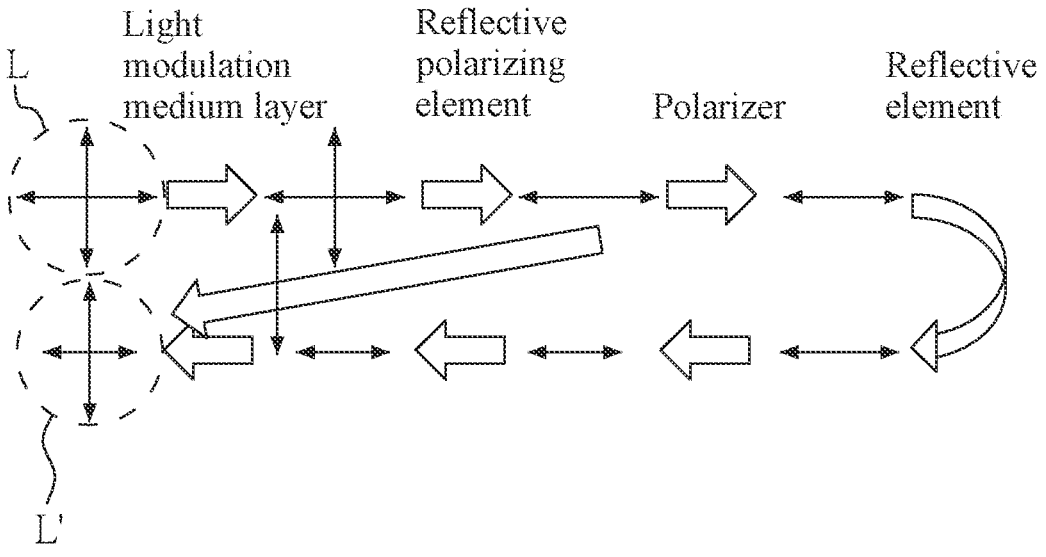

The following is a detailed description of the electronic device of the embodiments of the present disclosure. It should be understood that the following description provides many different embodiments for implementing different aspects of some embodiments of the present disclosure. The specific components and arrangements described below are used to briefly and clearly describe some embodiments of the present disclosure. Of course, these are only examples and not limitations of the present disclosure. In addition, similar and/or corresponding reference numbers may be used to identify similar and/or corresponding elements in different embodiments to clearly describe the present disclosure. However, the use of these similar and/or corresponding reference numbers is only for the purpose of simply and clearly describing some embodiments of the present disclosure, and does not imply any connection between the different embodiments and/or structures discussed.

It should be understood that relative terms, such as "lower" or "bottom" or "higher" or "top" may be used in the embodiment to describe the relative relationship of one element to another element shown in the figures. It will be understood that if the device in the figures is turned upside down, elements described as being on the "lower" side would then be elements described as being on the "upper" side. The embodiments of the present disclosure can be understood together with the figures, and the figures of the present disclosure are also regarded as part of the disclosure description. It should be understood that the figures of the present disclosure are not drawn to scale and, in fact, the dimensions of elements may be arbitrarily enlarged or reduced in order to clearly illustrate features of the present disclosure.

In the present disclosure, one structure (or layer, component, or substrate) is disposed on/above another structure (or layer, component, or substrate), this may mean that the two structures are adjacent and directly connected, or the two structures are adjacent and indirectly connected. Indirect connection means that there is at least one intermediary structure (or intermediary layer, intermediary component, intermediary substrate, intermediary spacer) between two structures, the lower surface of one structure is adjacent to or directly connected to the upper surface of the intermediary structure, and the upper surface of another structure is adjacent to or directly connected to the lower surface of the intermediate structure. The intermediary structure can be composed of a single-layer or multi-layer physical structure or non-physical structure, and is not limited. In the present disclosure, when a structure is disposed "on" the other structure, it may mean that the structure is "directly" disposed on the other structure, or that the structure is "indirectly" disposed on the other structure, that is, at least one structure may be sandwiched between the structure and the other structure.

Furthermore, the ordinals recited in the specification and the claims such as "first", "second" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation. The claims and the description may not use the same words. For example, a first element in the description may be a second element in the claims.

In some embodiments of the present disclosure, terms related to joining and connecting, such as "connection", "interconnection", etc., unless otherwise defined, may mean that two structures are in direct contact, or may also mean that two structures are not in direct contact and there are other structures located between these two structures. The terms "joint" and "connected" can also include situations where both structures are movable, or where both structures are fixed. In addition, the terms "electrical connection" or "coupling" include any direct and indirect means of electrical connection.

The terms, such as "about", "substantially", or "approximately", are generally interpreted as within 10%, 5%, 3%, 2%, 1%, or 0.5% of a given value or range. Unless otherwise stated, when a value is "in a range from a first value to a second value" or "in a range between a first value and a second value", the value can be the first value, the second value, or another value between the first value and the second value. Furthermore, any two numerical values or directions used for comparison may have certain errors. If the first value is equal to the second value, it implies that there may be an error of about 10% between the first value and the second value. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees. In the present disclosure, the terms "a given range is a first value to a second value" and "a given range falls within the range of a first value to a second value" mean that the given range includes the first value, the second value, or another value between the first value and the second value.

Furthermore, according to the embodiment of the present disclosure, an optical microscope (OM), a scanning electron microscope (SEM), a film thickness profiler (α-step), an ellipsometer, or other suitable manners can be used to measure the thickness, length or width of each component or the distance or angle between components. Specifically, according to some embodiments, a scanning electron microscope can be used to obtain cross-sectional images of the structure and measure the thickness, length or width of each component or the distance or angle between components.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names. In the following description and claims, words such as "comprising", "including", "containing", and "having" are open-ended words, so they should be interpreted as meaning "containing but not limited to.". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

It should be noted that the technical solutions provided by different embodiments hereinafter may be replaced, combined or used in combination, so as to constitute another embodiment without violating the spirit of the present disclosure. The features of various embodiments can be combined and used arbitrarily as long as they do not violate the spirit of the present disclosure or conflict with each other.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way. The present disclosure may be understood by referring to the following detailed description in conjunction with the accompanying drawings. It should be noted that, for the sake of easy understanding for readers and for the simplicity of the drawings, many of the figures in the present disclosure only depict a part of the electronic device, and specific components in the figures are not drawn according to actual scale. In addition, the number and size of components in the figures are only for illustration and are not intended to limit the scope of the present disclosure.

Throughout the present disclosure and the appended claims, certain words are used to refer to particular elements. Those skilled in the art will understand that electronic device manufacturers may refer to the same component by different names. The present disclosure is not intended to differentiate between components that have the same function but have different names.

The electronic device of the present disclosure may include electronic components. The electronic components may include passive components, active components, or a combination thereof, such as capacitors, resistors, inductors, varactor diodes, variable capacitors, filters, diodes, transistors, sensors, microelectromechanical system components (MEMS), liquid crystal chips, etc., but the present disclosure is not limited thereto. The diodes may include light emitting diodes or non-light emitting diodes. The diodes include P-N junction diodes, PIN diodes or constant current diodes. The light emitting diodes may include, for example, organic light emitting diodes (OLEDs), mini LEDs, micro LEDs, quantum dot LEDs, fluorescence, phosphors, other suitable materials, or a combination thereof, but the present disclosure is not limited thereto. Sensors may include, for example, capacitive sensors, optical sensors, electromagnetic sensors, fingerprint sensors (FPSs), touch sensors, antennas, or pen sensors, etc., but the present disclosure is not limited thereto. In the following, a display device is used as an electronic device to illustrate the content of the present disclosure, but the present disclosure is not limited thereto.

Electronic devices may include imaging devices, laminating devices, display devices, backlight devices, antenna devices, tiled devices, touch electronic devices (touch displays), curved electronic devices (curved displays) or non-rectangular electronic devices (free shape displays), but the present disclosure is not limited thereto. The electronic device may include, for example, liquid crystals, light emitting diodes, fluorescence, phosphors, other suitable display media, or a combination thereof, but the present disclosure is not limited thereto. The display device may be a non-self-luminous display device or a self-luminous display device, the antenna device may be a liquid crystal type antenna device or a non-liquid crystal type antenna device, and the sensing device may be a sensing device that senses capacitance, light, heat energy or ultrasonic waves; but the present disclosure is not limited thereto. The tiled device may be, for example, a tiled display device or a tiled antenna device, but the present disclosure is not limited thereto. It should be noted that the electronic device can be any combination thereof, but the present disclosure is not limited thereto. The electronic device may be a bendable or flexible electronic device. It should be noted that the electronic device can be any combination thereof, but the present disclosure is not limited thereto. In addition, the shape of the electronic device may be a rectangle, a circle, a polygon, a shape with curved edges, or other suitable shapes. The electronic devices may have peripheral systems such as drive systems, control systems, light source systems, shelf systems, etc. to support display devices, antenna devices, or tiled devices. It should be noted that the features provided by different embodiments hereinafter may be replaced, combined or used in combination, so as to constitute another embodiment without violating the spirit of the present disclosure. Features between various embodiments may be mixed and combined as long as they do not violate or conflict the spirit of the present disclosure. It should be noted that the technical solutions provided by different embodiments hereinafter may be replaced, combined or used in combination, so as to constitute another embodiment without violating the spirit of the present disclosure.

Figure 1B:
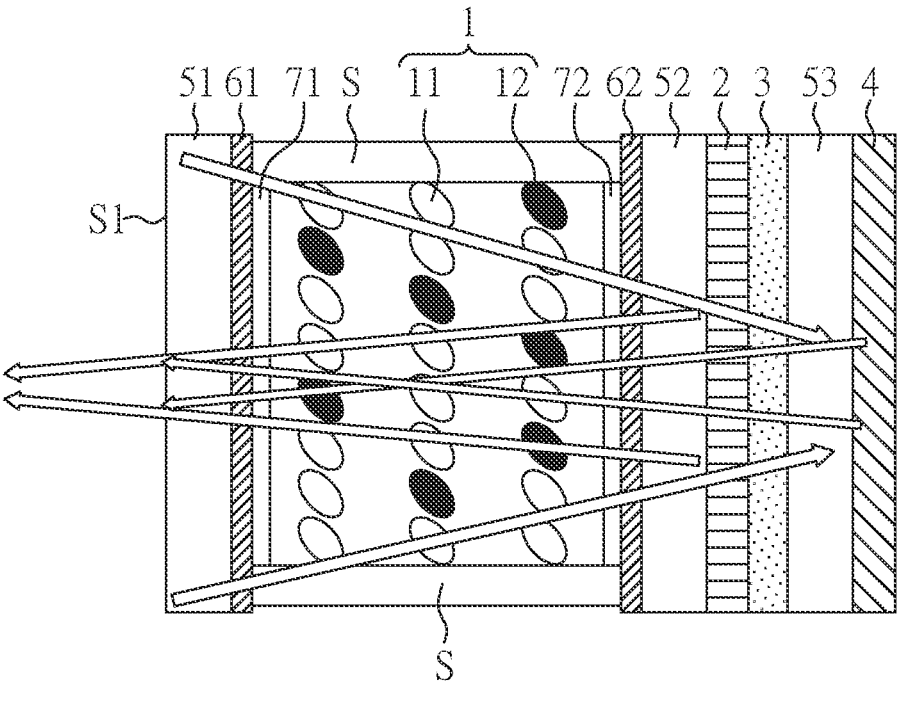
FIG. 1B is a schematic view of a low reflective mode of an electronic device according to one embodiment of the present disclosure.
Figure 1B:
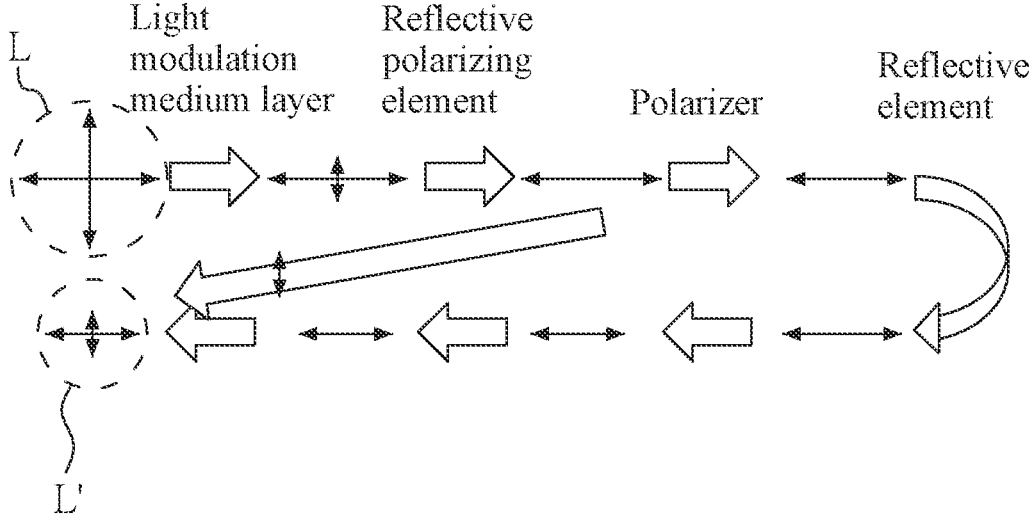
Figure 1C:
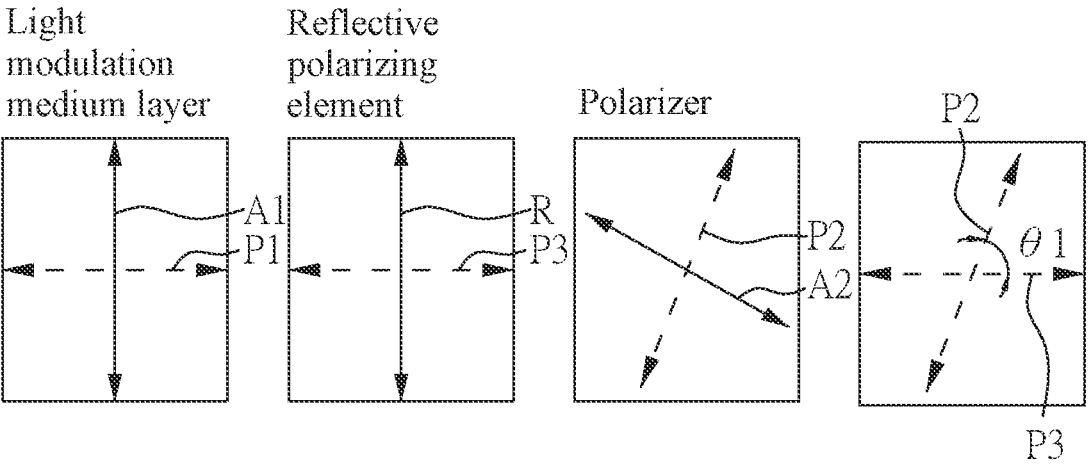
FIG. 1C is a schematic view showing an absorption axis, a transmission axis and a reflection axis of each element in an electronic device according to one embodiment of the present disclosure.

FIG. 1A is a schematic view of a high reflective mode of an electronic device according to one embodiment of the present disclosure. FIG. 1B is a schematic view of a low reflective mode of an electronic device according to one embodiment of the present disclosure. FIG. 1C is a schematic view showing an absorption axis, a transmission axis and a reflection axis of each element in an electronic device according to one embodiment of the present disclosure.

In one embodiment of the present disclosure, as shown in FIG. 1A and FIG. 1B, the electronic device may comprise: a light modulation medium layer 1 comprising a liquid crystal material 11 and a dye material 12; a reflective element 4 disposed opposite to the light modulation medium layer 1 and away from a display side S1 of the electronic device; a reflective polarizing element 2 disposed between the light modulation medium layer 1 and the reflective element 4; and a polarizer 3 disposed between the reflective polarizing element 2 and the reflective element 4, wherein the reflective element 4 has a reflectance of light with wavelengths ranging from 380 nm to 780 nm greater than or equal to 80%. Through the above arrangement, the electronic device can be switched between the high reflective mode and the low reflective mode to reduce the glare or improve the response rate of the electronic device. The switching between the high reflective mode and the low reflective mode will be explained later.

More specifically, as shown in FIG. 1A and FIG. 1B, the electronic device may comprise: a first substrate 51; and a second substrate 52 disposed opposite to the first substrate 51, wherein the light modulation medium layer 1 is disposed between the first substrate 51 and the second substrate 52, wherein the reflective element 4, the reflective polarizing element 2 and/or the polarizer 3 are respectively disposed at one side of the second substrate 52 away from the light modulation medium layer 1, and the reflective polarizing element 2 is disposed adjacent to the polarizer 3; but the present disclosure is not limited thereto. The reflective polarizing element 2 disposed adjacent to the polarizer 3 means that there are no other optical elements therebetween (for example, an optical element with phase retardation function or an optical element with polarization function), but it does not exclude that the two can be bonded and fixed through an adhesive.

In the present disclosure, the materials of the first substrate 51 and the second substrate 52 may be the same or different. The materials of the first substrate 51 and the second substrate 52 may respectively comprise glass, quartz, sapphire, ceramics, polycarbonate (PC), polyimide (PI), polyethylene terephthalate (PET), polymethylmethacrylate (PMMA), triacetate cellulose (TAC), other suitable substrate materials or a combination thereof; but the present disclosure is not limited thereto.

In the present disclosure, the light modulation medium layer 1 may comprise, for example, guest-host liquid crystals (GHLCs), for example, comprising a liquid crystal material 11 and a dye material 12. The liquid crystal material 11 may comprise polymer-dispersed liquid crystals (PDLCs), polymer network liquid crystals (PNLCs), twisted nematic liquid crystals (TN LCs), super twisted nematic liquid crystals (STN LCs), other suitable liquid crystal material or a combination thereof; but the present disclosure is not limited thereto. In the present disclosure, the dye material 12 may comprise dichroic dye, which has absorbance of light with wavelengths ranging from, for example, 360 nm to 830 nm; but the present disclosure is not limited thereto. The color of the dye material 12 may be, for example, black, purple, orange, blue, other suitable color or a combination thereof; but the present disclosure is not limited thereto. The dye materials 12 with different colors can be used to absorb light with different wavelengths (for example, light in different visible light bands) and can be used to adjust the color of the transmitted light.

In the present disclosure, the material of the reflective element 4 may include a metallic material, a non-metallic material (such as a white material or other reflective materials with suitable colors), other reflective materials or a combination thereof. The metallic material may include, for example, gold, silver, copper, aluminum, other suitable materials, or a combination thereof, but the present disclosure is not limited thereto. The white material includes, for example, a white substrate, white ink, white polyimide, white resin, other suitable materials, or a combination thereof, but the present disclosure is not limited thereto. In the present disclosure, the reflective element 4 may have a reflectance of light with wavelengths ranging from 380 nm to 780 nm greater than or equal to 80% and less than 100%, for example, greater than or equal to 85% and less than 100%, or greater than or equal to 88% and less than 100%, or greater than or equal to 90% and less than 100%; but the present disclosure is not limited thereto. In the present disclosure, the reflective polarizing element 2 may include, for example, a polarizing plate with a reflective function, but the present disclosure is not limited thereto. In the present disclosure, the polarizer 3 may be any polarizer known in the art, such as a dye-based polarizing element, an iodine-based polarizing element or polarizing elements of other materials, but the present disclosure is not limited thereto.

In one embodiment of the present disclosure, as shown in FIG. 1A and FIG. 1B, the electronic device may comprise: a first electrode layer 61 disposed between the first substrate 51 and the light modulation medium layer 1; a first alignment layer 71 disposed between the electrode layer 61 and the light modulation medium layer 1; a second electrode layer 62 disposed between the second substrate 52 and the light modulation medium layer 1; and a second alignment layer 72 disposed between the second electrode layer 62 and the light modulation medium layer 1, wherein the light modulation medium layer 1 is disposed between the first alignment layer 71 and the second alignment layer 72. In the present disclosure, when no voltage is applied, the liquid crystal material 11 and the dye material 12 in the light modulation medium layer 1 may be arranged according to the alignment directions of the first alignment layer 71 and the second alignment layer 72. By applying or not applying voltage to the first electrode layer 61 and the second electrode layer 62, the arrangements of the liquid crystal material 11 and the dye material 12 in the light modulation medium layer 1 can be controlled, thereby switching the high reflective mode and the low reflective mode. For example, if the liquid crystal material 11 in the light modulation medium layer 1 is a positive liquid crystal, the first alignment layer 71 and the second alignment layer 72 are, for example, horizontally aligned. When no voltage is applied to the first electrode layer 61 and the second electrode layer 62, the liquid crystal material 11 and the dye material 12 in the light modulation medium layer 1 are, for example, arranged approximately parallel to the surface of the first substrate 51 (or the surface of the second substrate 52). When a voltage is applied to the first electrode layer 61 and the second electrode layer 62 to generate an electric field (for example, a vertical electric field) between the first electrode layer 61 and the second electrode layer 62, the arrangement direction of the liquid crystal material 11 and the dye material 12 in the light modulation medium layer 1 is, for example, approximately parallel to the electric field direction, so that the liquid crystal material 11 and the dye material 12 are arranged, for example, approximately perpendicular to the surface of the first substrate 51 (or the surface of the second substrate 52). For example, if the liquid crystal material 11 in the light modulation medium layer 1 is a negative liquid crystal, the first alignment layer 71 and the second alignment layer 72 are, for example, vertically aligned. When no voltage is applied to the first electrode layer 61 and the second electrode layer 62, the liquid crystal material 11 and the dye material 12 in the light modulation medium layer 1 are arranged, for example, approximately perpendicular to the surface of the first substrate 51 (or the surface of the second substrate 52). When a voltage is applied to the first electrode layer 61 and the second electrode layer 62 to generate an electric field (for example, a vertical electric field) between the first electrode layer 61 and the second electrode layer 62, the arrangement direction of the liquid crystal material 11 and the dye material 12 in the light modulation medium layer 1 is, for example, approximately perpendicular to the electric field direction.

In the present disclosure, the materials of the first electrode layer 61 and the second electrode layer 62 may be the same or different. The materials of the first electrode layer 61 and the second electrode layer 62 may respectively include a transparent conductive material, such as indium zinc oxide (IZO), indium tin oxide (ITO), indium tin zinc oxide (ITZO), indium gallium zinc oxide (IGZO), aluminum zinc oxide (AZO), other suitable materials or a combination thereof; but the present disclosure is not limited thereto.

In one embodiment of the present disclosure, as shown in FIG. 1A and FIG. 1B, the reflective polarizing element 2 is disposed adjacent to the polarizer 3. As shown in FIG. 1A and FIG. 1B, the electronic device may comprise: a third substrate 53 disposed between the reflective element 4 and the polarizer 3. In this embodiment, for example, the reflective element 4 may be disposed on the third substrate 53 first, and then assembled with the assembled panel (for example, including the first substrate 51 and the second substrate 52 opposite to each other, and the light modulation medium layer 1 disposed between the first substrate 51 and the second substrate 52). Through the above method, the impact or damage of the light modulation medium layer 1 or other components (such as the electrodes or the alignment layers, but not limited thereto) in the panel due to the high temperature when setting the reflective element 4 can be reduced, and the yield or quality of the electronic device can be improved. In one embodiment of the present disclosure, as shown in FIG. 1A and FIG. 1B, the reflective polarizing element 2 and/or the polarizer 3 is disposed between the second substrate 52 and the third substrate 53, but the present disclosure is not limited thereto. In one embodiment of the present disclosure, as shown in FIG. 1A and FIG. 1B, the reflective element 4 is disposed at one side of the third substrate 53 away from the display side S1 of the electronic device. In one embodiment of the present disclosure, even not shown in the figure, the electronic device may not be disposed with the third substrate 53 to reduce the thickness of the electronic device or save costs; but the present disclosure is not limited thereto. In the present disclosure, the material of the third substrate 53 may be the same or different from that of the first substrate 51 and/or the second substrate 52, and the material of the third substrate 53 is as described in the materials of the first substrate 51 and the second substrate 52 and is not described again. The thickness of the third substrate 53 may be the same or different from the thickness of the first substrate 51 and/or the thickness of the second substrate 52.

In one embodiment of the present disclosure, as shown in FIG. 1A and FIG. 1B, the electronic device may comprise a sealant S disposed surrounding the light modulation medium layer 1. In the present disclosure, the material of the sealant S may comprise glass glue, optical glue, silicone glue, tape, hot melt glue, AB glue, two-component adhesive, light-curing glue, polymer glue, resin or a combination thereof, but the present disclosure is not limited thereto.

In one embodiment of the present disclosure, as shown in FIG. 1C, the polarizer 3 has a second transmission axis P2 and a second absorption axis A2 approximately perpendicular to the second transmission axis P2. The reflective polarizing element 2 has a third transmission axis P3 and a reflection axis R approximately perpendicular to the transmission axis P3. In one embodiment of the present disclosure, the electronic device can be switched between the high reflective mode and the low reflective mode. As shown in FIG. 1C and FIG. 1B, when the electronic device is switched to the low reflective mode, the arrangement direction of the liquid crystal material 11 and the dye material 12 in the light modulation medium layer 1 is, for example, approximately parallel to the surface of the first substrate 51 (or the surface of the second substrate 52). At this time, the light modulation medium layer 1 may have a first transmission axis P1 and a first absorption axis A1 approximately perpendicular to the first transmission axis P1. In one embodiment of the present disclosure, the reflection axis R of the reflective polarizing element 2 may be approximately parallel to the first absorption axis A1 of the light modulation medium layer 1. In one embodiment of the present disclosure, the second transmission axis P2 of the polarizer 3 and the third transmission axis P3 of the reflective polarizing element 2 may not be parallel. More specifically, a first angle θ1 may be included between the second transmission axis P2 of the polarizer 3 and the third transmission axis P3 of the reflective polarizing element 2, and the first angle θ1 ranges from 10 degrees (°) to 80 degrees or from 100 degrees to 170 degrees. The "parallel" may mean, for example, that the angle between the two axes is between 0 degrees and 10 degrees (for example, 0 degrees≤ the angle between the two axes≤10 degrees). The "perpendicular" may mean, for example, that the angle between the two axes is between 80 degrees and 100 degrees (for example, 80 degrees≤ the angle between the two axes≤100 degrees).

The following will describe in detail how light passes through the electronic device when it is in the high reflective mode and the low reflective mode. Herein, the horizontal two-way arrows in FIG. 1A and FIG. 1B represent horizontally polarized light, and the vertical two-way arrows represent vertically polarized light.

In one embodiment of the present disclosure, as shown in FIG. 1A and FIG. 1C, the liquid crystal material 11 is, for example, a negative liquid crystal, and the first alignment layer 71 and the second alignment layer 72 may be, for example, vertically aligned respectively; but the present disclosure is not limited thereto. In other embodiments, the liquid crystal material 11 may be a positive liquid crystal, and the first alignment layer 71 and the second alignment layer 72 may be, for example, horizontally aligned respectively; but the present disclosure is not limited thereto. When the electronic device is switched to the high reflective mode, the long axis direction of the liquid crystal material 11 and the long axis direction of the dye material 12 in the light modulation medium layer 1 may be approximately perpendicular to the surfaces of the first substrate 51 and the second substrate 52 respectively. At this time, the incident light L (including horizontally polarized light and vertically polarized light), for example, is not easily absorbed by the dye material 12, and most of the incident light L may pass through the light modulation medium layer 1. Then, since the third transmission axis P3 of the reflective polarizing element 2 is, for example, approximately parallel to the horizontally polarized light, most of the horizontally polarized light may pass through the reflective polarizing element 2. In addition, since the reflection axis R of the reflective polarizing element 2 is parallel to the vertically polarized light, most of the vertically polarized light may be reflected by the reflective polarizing element 2, forming a part of the emitted light L' as shown in FIG. 1A (for example, vertically polarized light). Then, since the second absorption axis A2 of polarizer 3 is not parallel to the third transmission axis P3 of the reflective polarizing element 2, that is, the second absorption axis A2 of the polarizer 3 is not parallel to the horizontally polarized light passing through reflective polarizing element 2, at least part of the horizontally polarized light passing through the reflective polarizing element 2 may be absorbed by the polarizer 3. The partially horizontally polarized light that passes through the polarizer 3 may be, for example, reflected back to the polarizer 3 by the reflective element 4, and the reflected horizontally polarized light is partially absorbed by the polarizer 3 again. Since the third transmission axis P3 of the reflective polarizing element 2 is approximately parallel to the horizontally polarized light, the horizontally polarized light passing through the polarizer 3 and the reflective polarizing element 2 may pass through the light modulation medium layer 1 and form part of the emitted light L' (for example, horizontally polarized light), that is, the emitted light L' includes, for example, at least two parts, horizontally polarized light and vertically polarized light. Through the above-mentioned axial relationships between the light modulation medium layer 1, the reflective polarizing element 2, and the polarizer 3, the amount of light emitted by the electronic device in the high reflective mode can be increased when switching to the high reflective mode; but the present disclosure is not limited thereto.

In one embodiment of the present disclosure, as shown in FIG. 1B and FIG. 1C, the liquid crystal material 11 is, for example, a negative liquid crystal, and the first alignment layer 71 and the second alignment layer 72 may be, for example, vertically aligned respectively. When the electronic device is switched to the low reflective mode (for example, a voltage is applied to the first electrode layer 61 and the second electrode layer 62), the long axis direction of the liquid crystal material 11 and the long axis direction of the dye material 12 in the light modulation medium layer 1 may be parallel to the surfaces of the first substrate 51 and the second substrate 52 respectively. At this time, part of the incident light L (for example, vertically polarized light) is easily absorbed by the dye material 12, that is, most of the vertically polarized light will be absorbed by the dye material 12, and only part of the vertically polarized light may pass through the light modulation medium layer 1. Then, since the third transmission axis P3 of the reflective polarizing element 2 is approximately parallel to the horizontally polarized light, most of the horizontally polarized light may pass through the reflective polarizing element 2. In addition, since the reflection axis R of the reflective polarizing element 2 is parallel to the vertically polarized light, a small part of the vertically polarized light passing through the light modulation medium layer 1 may be reflected by the reflective polarizing element 2, forming a part of the emitted light L' (for example, vertically polarized light). Then, since the second transmission axis P2 of the polarizer 3 is not parallel to the horizontally polarized light, part of the horizontally polarized light that passes through the reflective polarizing element 2 may be, for example, absorbed by the polarizer 3, and only part of the horizontally polarized light may pass through the polarizer 3. Part of the horizontally polarized light passing through the polarizer 3 is, for example, reflected back to the polarizer 3 by the reflective element 4, and part of the horizontally polarized light is absorbed by the polarizer 3 again. Since this part of horizontally polarized light is approximately parallel to the third transmission axis P3 of the reflective polarizing element 2 and/or the first transmission axis P1 of the light modulation medium layer 1, the part of horizontally polarized light that passes through polarizer 3, for example, passes through the reflective polarizing element 2 and the light modulation medium layer 1, forming a part of the emitted light L' (for example, horizontally polarized light), that is, the emitted light L' at least includes, for example, a small amount of horizontally polarized light and a small amount of vertically polarized light. Through the above-mentioned axial relationships between the light modulation medium layer 1, the reflective polarizing element 2, and the polarizer 3, the glare generated by the electronic device can be reduced when switching to the low reflective mode.

Figure 2:
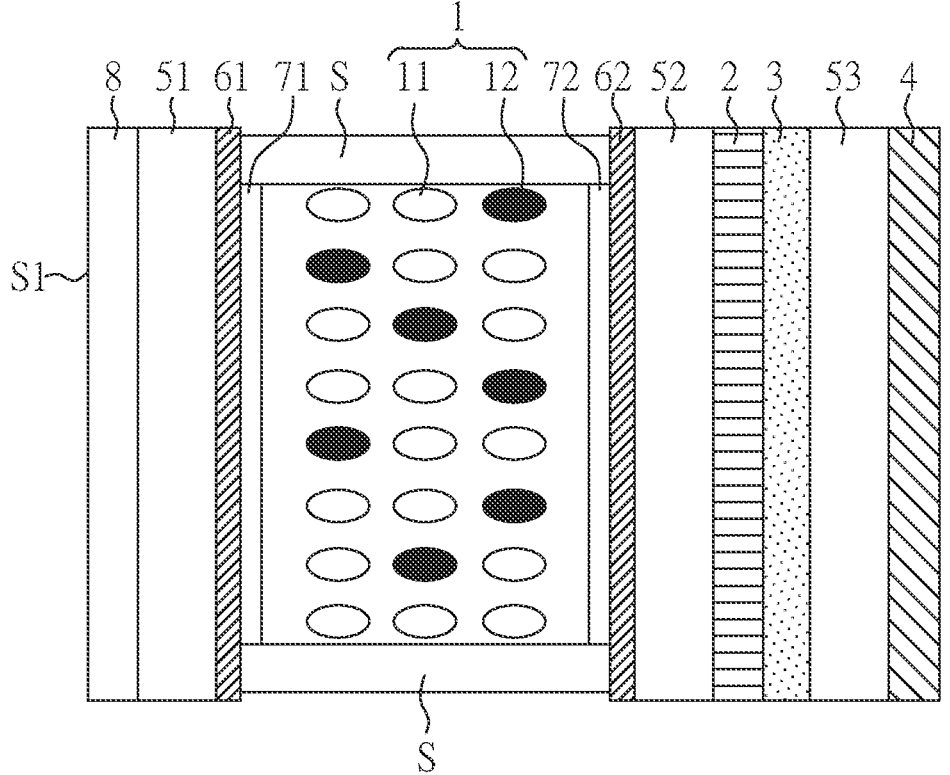
FIG. 2 is a schematic view of an electronic device according to one embodiment of the present disclosure.

FIG. 2 is a schematic view of an electronic device according to one embodiment of the present disclosure. The electronic device in FIG. 2 is similar to that in FIG. 1A, except for the following differences.

In one embodiment of the present disclosure, as shown in FIG. 2, the electronic device may further comprise an optical element 8 disposed at one side of the first substrate 51 away from the light modulation medium layer 1, and the light modulation medium layer 1 is disposed between the optical element 8 and the reflective polarizing element 2. More specifically, the optical element 8 may be closer to the display side S1 of the electronic device than the light modulation medium layer 1. The optical element 8 may comprise an anti-glare layer, an anti-reflective layer or a combination thereof; but the present disclosure is not limited thereto. Thus, the glare of the electronic device can be improved. In some embodiments, the anti-glare layer may be formed of a transparent organic material or inorganic material, and the haze of the anti-glare layer may range from 1 Haze to 65 Haze; but the present disclosure is not limited thereto. In some embodiments, the anti-glare layer may be formed by screen printing, coating or other suitable methods. In some embodiments, the anti-reflective layer includes, for example, multiple layers formed by stacking high refractive index and low refractive index materials, but the present disclosure is not limited thereto.

In the present disclosure, the optical element 8 may include, for example, an optical film. The optical film may be attached to the surface of the first substrate 51 away from the light modulation medium layer 1 through an adhesive layer (not shown). Alternatively, the optical element 8 may be, for example, an optical coating layer, and the optical coating layer may be formed by surface treatment of the surface of the first substrate 51 away from the light modulation medium layer 1. However, the present disclosure is not limited thereto. In the present disclosure, other components and materials of the electronic device in FIG. 2 can be as described above and are not described again here.

Figures 3, 4:
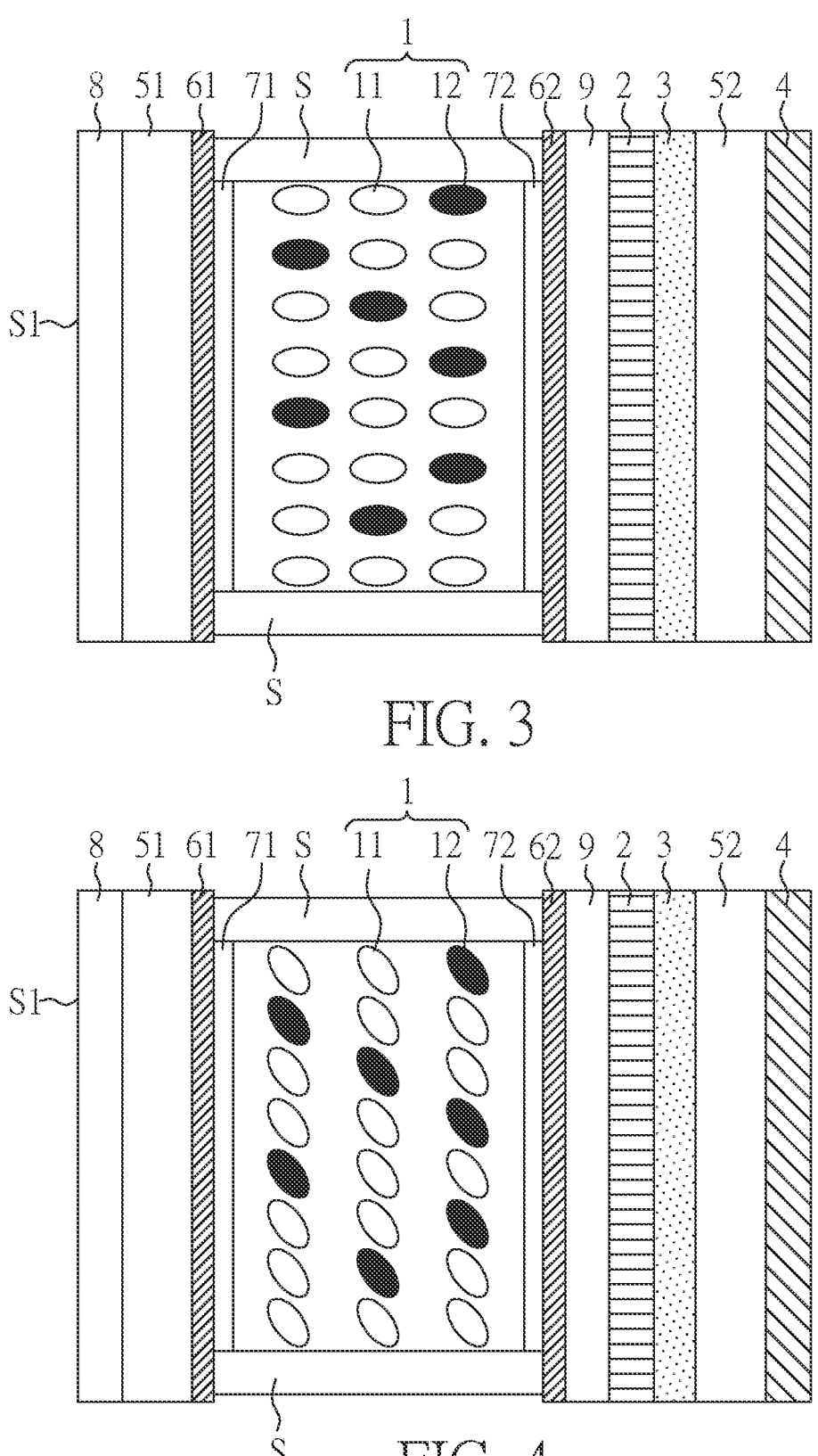
FIG. 3 is a schematic view of an electronic device according to one embodiment of the present disclosure.
FIG. 4 is a schematic view of an electronic device according to one embodiment of the present disclosure.

FIG. 3 is a schematic view of an electronic device according to one embodiment of the present disclosure. The electronic device in FIG. 3 is similar to that in FIG. 1A, except for the following differences.

In one embodiment of the present disclosure, as shown in FIG. 3, the electronic device comprises: a first substrate 51; and a second substrate 52 disposed opposite to the first substrate 51, wherein the light modulation medium layer 1 is disposed between the first substrate 51 and the second substrate 52, the reflective polarizing element 2 and the polarizer 3 are disposed between the light modulation medium layer 1 and the second substrate 52, and the reflective polarizing element 2 and the polarizer 3 are disposed, for example, adjacent to each other.

In one embodiment of the present disclosure, as shown in FIG. 3, the electronic device comprises: a first electrode layer 61 disposed between the light modulation medium layer 1 and the first substrate 51; and a second electrode layer 62 disposed between the light modulation medium layer 1 and the reflective polarizing element 2; and an insulating layer 9 disposed between the second electrode layer 62 and the reflective polarizing element 2.

In the present disclosure, the material of the insulating layer 9 may comprise a transparent insulating material, for example, including silicon oxide, silicon nitride, silicon oxynitride, aluminum oxide, resin, polymer, photoresist or a combination thereof; but the present disclosure is not limited thereto. The second electrode layer 62 may be, for example, disposed between the second alignment layer 72 and the insulating layer 9. In one embodiment of the present disclosure, as shown in FIG. 3, the electronic device may further comprise an optical element 8 disposed at one side of the first substrate 51 away from the light modulation medium layer 1. More specifically, the optical element 8 is closer to the display side S1 of the electronic device than the light modulation medium layer 1. The optical element 8 may comprise an anti-glare layer, an anti-reflective layer or a combination thereof to improve the glare of electronic devices. The details of the optical element 8 can be referred to the above. In the present disclosure, other components and materials of the electronic device in FIG. 3 can be as described above, and will not be described again here.

In one embodiment of the present disclosure (as shown in FIG. 3), the first alignment layer 71 and the second alignment layer 72 may be, for example, vertically aligned, and the liquid crystal material 11 may be, for example, a negative liquid crystal. When a voltage is applied or not applied to the first electrode layer 61 and the second electrode layer 62, the arrangement direction of the liquid crystal material 11 and the dye material 12 can be controlled, thereby switching between the high reflective mode and the low reflective mode. As shown in FIG. 3, when no voltage is applied to the first electrode layer 61 and the second electrode layer 62, the long axis direction of the liquid crystal material 11 and the long axis direction of the dye material 12 in the light modulation medium layer 1 may be respectively vertical to the surfaces of the first substrate 51 and the second substrate 52. At this time, the incident light is not easily absorbed by the dye material 12, and the electronic device at this time can be in the high reflective mode. Similarly, even not shown in the figure (which may refer to FIG. 1B), when a voltage is applied to the first electrode layer 61 and the second electrode layer 62, the long axis direction of the liquid crystal material 11 and the long axis direction of the dye material 12 in the light modulation medium layer 1 can be approximately parallel to the first substrate 51 and the second substrate 52 respectively. At this time, the incident light is easily absorbed by the dye material 12, so the electronic device can be in the low reflective mode.

FIG. 4 is a schematic view of an electronic device according to one embodiment of the present disclosure. The electronic device in FIG. 4 is similar to that in FIG. 1B, except for the following differences.

In one embodiment of the present disclosure, as shown in FIG. 4, the electronic device comprises: a first substrate 51; and a second substrate 52 disposed opposite to the first substrate 51, wherein the light modulation medium layer 1 is disposed between the first substrate 51 and the second substrate 52, and the reflective polarizing element 2 and the polarizer 3 are disposed between the light modulation medium layer 1 and the second substrate 52.

In one embodiment of the present disclosure, as shown in FIG. 4, the electronic device comprises: a first electrode layer 61 disposed between the light modulation medium layer 1 and the first substrate 51; a second electrode layer 62 disposed between the light modulation medium layer 1 and the reflective polarizing element 2; and an insulating layer 9 disposed between the second electrode layer 62 and the reflective polarizing element 2.

In one embodiment of the present disclosure, as shown in FIG. 4, the electronic device may further comprise an optical element 8 disposed at one side of the first substrate 51 away from the light modulation medium layer 1, and the optical element 8 is closer to the display side S1 of the electronic device than the light modulation medium layer 1. The optical element 8 may comprise an anti-glare layer, an anti-reflective layer or a combination thereof to improve the glare of electronic devices. The details of the optical element 8 can be referred to the above.

In one embodiment of the present disclosure (as shown in FIG. 4), the first alignment layer 71 and the second alignment layer 72 may be, for example, horizontally aligned respectively, and the liquid crystal material 11 may be, for example, a positive liquid crystal. When a voltage is applied or not applied to the first electrode layer 61 and the second electrode layer 62, the arrangement direction of the liquid crystal material 11 and the dye material 12 can be controlled, thereby switching between the high reflective mode and the low reflective mode. As shown in FIG. 4, when no voltage is applied to the first electrode layer 61 and the second electrode layer 62, the long axis direction of the liquid crystal material 11 and the long axis direction of the dye material 12 in the light modulation medium layer 1 may be parallel to the surfaces of the first substrate 51 and the second substrate respectively. At this time, at least part of the incident light is easily absorbed by the dye material 12, and the electronic device at this time can be in the low reflective mode. Similarly, even not shown in the figure (which may refer to FIG. 1A), when a voltage is applied to the first electrode layer 61 and the second electrode layer 62, the long axis direction of the liquid crystal material 11 and the long axis direction of the dye material 12 in the light modulation medium layer 1 may be approximately perpendicular to the first substrate 51 and the second substrate 52 respectively. At this time, the incident light is not easily absorbed by the dye material 12. Therefore, most of the incident light may pass through the light modulation medium layer 1, and the electronic device can be in the high reflective mode.

Figure 5A:
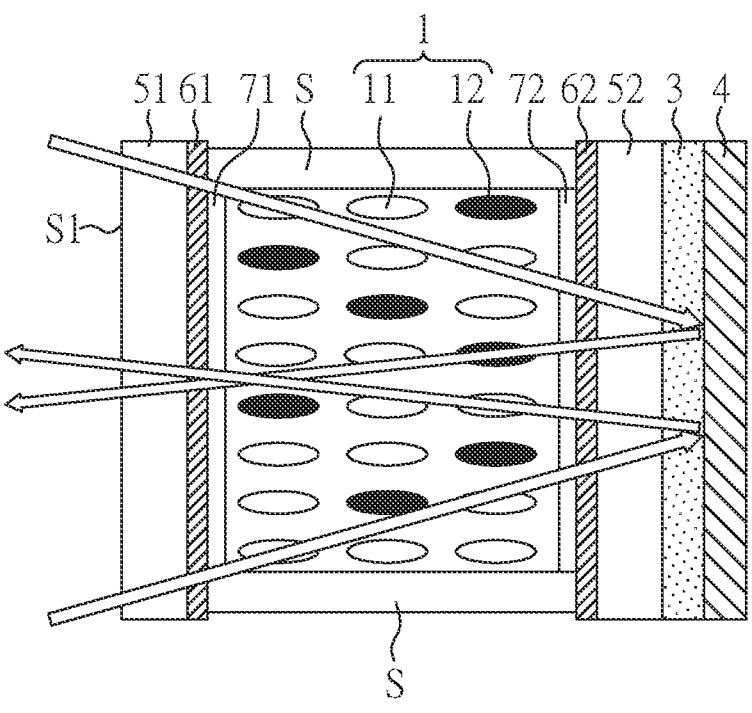
FIG. 5A is a schematic view of a high reflective mode of an electronic device according to one embodiment of the present disclosure.
Figure 5A:
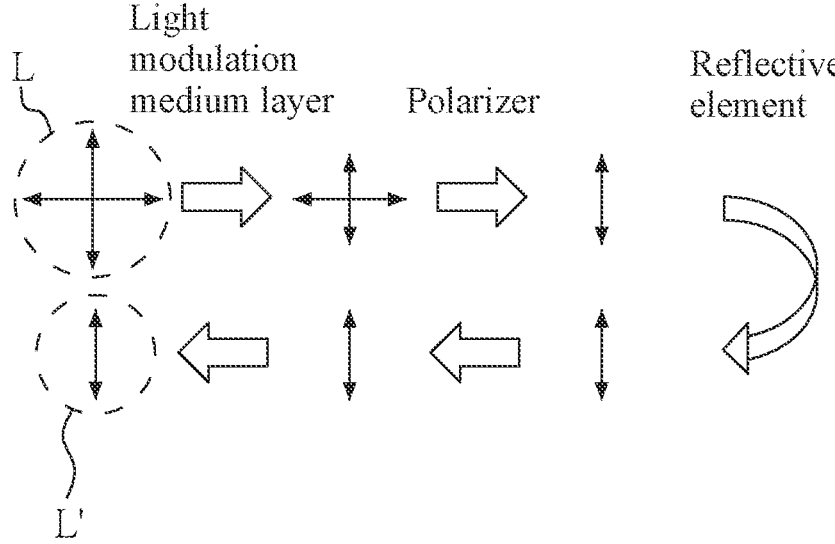
Figure 5B:
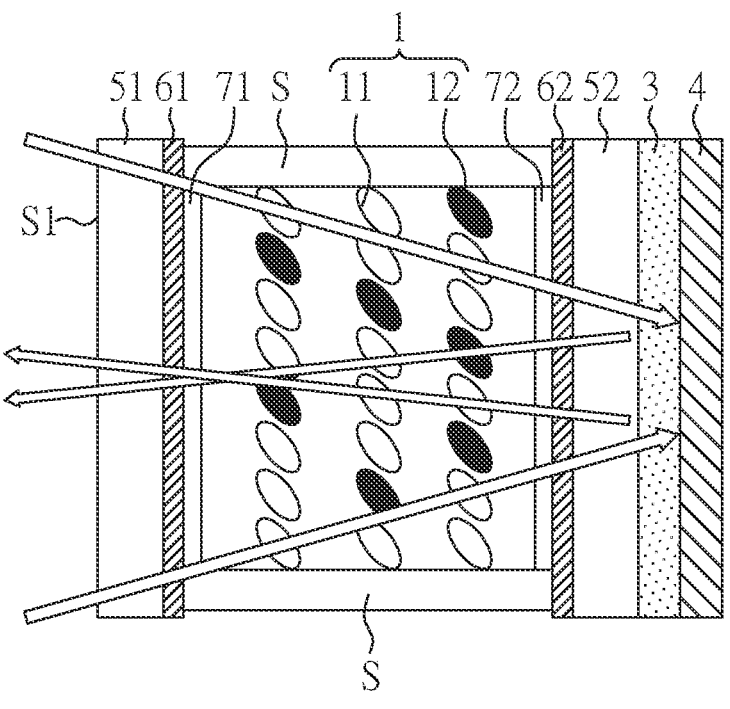
FIG. 5B is a schematic view of a low reflective mode of an electronic device according to one embodiment of the present disclosure.
Figure 5B:
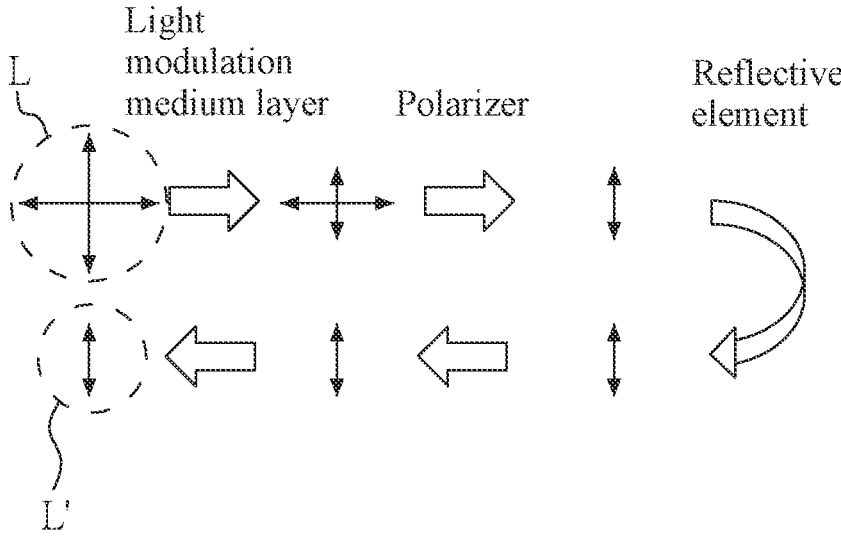
Figure 5C:
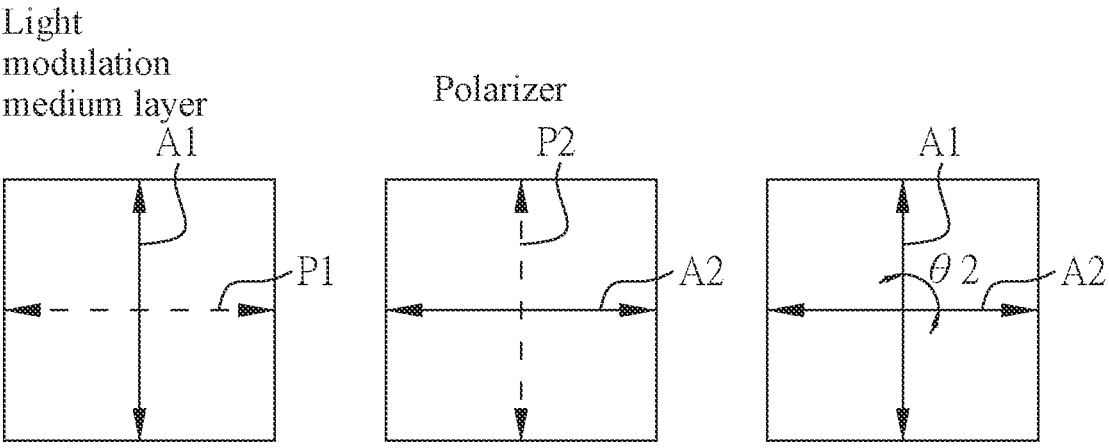
FIG. 5C is a schematic view showing an absorption axis and a transmission axis of each element in an electronic device according to one embodiment of the present disclosure.

FIG. 5A is a schematic view of a high reflective mode of an electronic device according to one embodiment of the present disclosure. FIG. 5B is a schematic view of a low reflective mode of an electronic device according to one embodiment of the present disclosure. FIG. 5C is a schematic view showing an absorption axis and a transmission axis of each element in an electronic device according to one embodiment of the present disclosure.

In one embodiment of the present disclosure, as shown in FIG. 5A and FIG. 5B, the electronic device may comprise: a light modulation medium layer 1 comprising a liquid crystal material 11 and a dye material 12; a reflective element 4 disposed opposite to the light modulation medium layer 1 and away from a display side S1 of the electronic device; and a polarizer 3 disposed between the light modulation medium layer 1 and the reflective element 4, wherein the polarizer 3 and the reflective element 4 are disposed, for example, adjacent to each other. Herein, the reflective element 4 has a reflectance of light with wavelengths ranging from 380 nm to 780 nm greater than or equal to 80%. Through the above arrangement, the electronic device can be switched between the high reflective mode and the low reflective mode, thereby reducing the glare of the electronic device or improving the reaction rate.

More specifically, as shown in FIG. 5A and FIG. 5B, the electronic device may comprise: a first substrate 51; and a second substrate 52 disposed opposite to the first substrate 51, wherein the light modulation medium layer 1 is disposed between the first substrate 51 and the second substrate 52, and the reflective element 4 and/or the polarizer 3 is respectively disposed at one side of the second substrate 52 away from the light modulation medium layer 1 (i.e. the side away from the display side S1), and the polarizer 3 is disposed between the second substrate 52 and the reflective element 4.

In one embodiment of the present disclosure, as shown in FIG. 5A and FIG. 5B, the electronic device may comprise: a first electrode layer 61 disposed between the first substrate 51 and the light modulation medium layer 1; a first alignment layer 71 disposed between the first electrode layer 61 and the light modulation medium layer 1; a second electrode layer 62 disposed between the second substrate 52 and the light modulation medium layer 1; and a second alignment layer 72 disposed between the second electrode layer 62 and the light modulation medium layer 1, wherein the light modulation medium layer 1 is disposed between the first alignment layer 71 and the second alignment layer 72. In the present disclosure, the liquid crystal material 11 and the dye material 12 in the light modulation medium layer 1 may be arranged, for example, by the alignment direction of the first alignment layer 71 and the second alignment layer 72. By applying or not applying voltage to the first electrode layer 51 and the second electrode layer 52, the arrangement direction of the liquid crystal material 11 and the dye material 12 is controlled, thereby switching the high reflective mode and the low reflective mode. Regarding the alignment direction of the first alignment layer 71 and the second alignment layer 72 (for example, horizontal alignment or vertical alignment) and the selection and driving of the liquid crystal material 11 (for example, positive or negative liquid crystal material), please refer to the above description.

In the present disclosure, the materials and the features of the first substrate 51, the second substrate 52, the first electrode layer 61, the second electrode layer 62, the first alignment layer 71, the second alignment layer 72, the liquid crystal material 11, the dye material 12, the reflective element 4 and the polarizer 3 can be referred to those described above and are not described again here.

In one embodiment of the present disclosure, the polarizer 3 has a second transmission axis P2 and a second absorption axis A2 approximately perpendicular to the second transmission axis P2. In one embodiment of the present disclosure, the electronic device may be switched to the high reflective mode and the low reflective mode. As shown in FIG. 5C and FIG. 5B, when the electronic device is switched to the low reflective mode, the arrangement direction of the liquid crystal material 11 and the dye material 12 in the light modulation medium layer 1 is, for example, approximately parallel to the surface of the first substrate 51 (or the surface of the second substrate 52). At this time, the light modulation medium layer 1 has a first transmission axis P1 and a first absorption axis A1 approximately perpendicular to the first transmission axis P1. In one embodiment of the present disclosure, a second angle θ2 included between the first absorption axis A1 of the light modulation medium layer 1 and the second absorption axis A2 of the polarizer 3 may range from 80 degrees to 100 degrees; but the present disclosure is not limited thereto. In one embodiment of the present disclosure, the first absorption axis A1 and the second absorption axis A2 may be perpendicular to each other, i.e. the second angle θ2 included between the first absorption axis A1 and the second absorption axis A2 may be, for example, 90 degrees. The "perpendicular" may mean, for example, that the angle between the two axes is between 80 degrees and 100 degrees (for example, 80 degrees≤ the angle between the two axes≤100 degrees).

The following will describe in detail how light passes through the electronic device when it is in the high reflective mode and the low reflective mode. Herein, the horizontal two-way arrows in FIG. 5A and FIG. 5B represent horizontally polarized light, and the vertical two-way arrows represent vertically polarized light.

In one embodiment of the present disclosure, as shown in FIG. 5A and FIG. 5C, the liquid crystal material 11 is, for example, a negative liquid crystal, and the first alignment layer 71 and the second alignment layer 72 may be, for example, vertically aligned respectively; but the present disclosure is not limited thereto. In other embodiments, the liquid crystal material 11 is, for example, a positive liquid crystal, and the first alignment layer 71 and the second alignment layer 72 may be, for example, horizontally aligned respectively; but the present disclosure is not limited thereto. When the electronic device is switched to the high reflective mode, the long axis direction of the liquid crystal material 11 and the long axis direction of the dye material 12 in the light modulation medium layer 1 can be approximately perpendicular to the first substrate 51 and the second substrate 52 respectively. At this time, the incident light L (including horizontally polarized light and vertically polarized light) is not easily absorbed by the dye material 12. Therefore, most of the incident light L (including horizontally polarized light and vertically polarized light) can penetrate the light modulation medium layer 1. Then, since the second absorption axis A2 of the polarizer 3 is approximately parallel to the horizontally polarized light passing through the light modulation medium layer 1, most of the horizontally polarized light passing through light modulation medium layer 1 can be absorbed by the polarizer 3. Since the second transmission axis P2 of the polarizer 3 is approximately parallel to the vertically polarized light, most of the vertically polarized light passing through the light modulation medium layer 1 can pass through the polarizer 3. The vertically polarized light passing through the polarizer 3 is reflected by the reflective element 4 to the polarizer 3. Most of the reflected vertically polarized light can pass through the polarizer 3 and the light modulation medium layer 1 again, forming part of the emitted light L' (for example, vertically polarized light), that is, the emitted light L' mainly includes, for example, vertically polarized light. Through the above-mentioned axial relationships between the light modulation medium layer 1 and the polarizer 3, a suitable amount of light can be achieved when switching to the high reflective mode; but the present disclosure is not limited thereto.

In one embodiment of the present disclosure, as shown in FIG. 5B and FIG. 5C, the liquid crystal material 11 is, for example, a negative liquid crystal, and the first alignment layer 71 and the second alignment layer 72 may be, for example, vertically aligned respectively. When the electronic device switches to low reflective mode (for example, applying voltage to the first electrode layer 61 and the second electrode layer 62), the long axis direction of the liquid crystal material 11 and the long axis direction of the dye material 12 in the light modulation medium layer 1 can be approximately parallel to the first substrate 51 and the second substrate 52 respectively. At this time, part of the incident light L (for example, vertically polarized light) is easily absorbed by the dye material 12, that is, most of the vertically polarized light will be absorbed by the dye material 12, a small part of the vertically polarized light is not absorbed and penetrates the light modulation medium layer 1, and most of the horizontally polarized light can, for example, pass through the light modulation medium layer 1. Then, since the second absorption axis A2 of the polarizer 3 is approximately parallel to the horizontally polarized light passing through the light modulation medium layer 1, most of the horizontally polarized light can be absorbed by polarizer 3. Since the second transmission axis P2 of the polarizer 3 is approximately parallel to the vertically polarized light penetrating the light modulation medium layer 1, the passing vertically polarized light can pass through the polarizer 3. After that, the above-mentioned vertically polarized light passing through the polarizer 3 is reflected by the reflective element 4 to the polarizer 3. The above-mentioned reflected vertically polarized light passes through the polarizer 3 and the light modulation medium layer 1 again, forming a small part of the emitted light L' (for example, vertically polarized light), that is, the emitted light L' at least includes, for example, a small amount of vertically polarized light. Through the above-mentioned axial relationships between the light modulation medium layer 1 and the polarizer 3, the glare generated by the electronic device can be reduced when switching to the low reflective mode.

Figure 6:
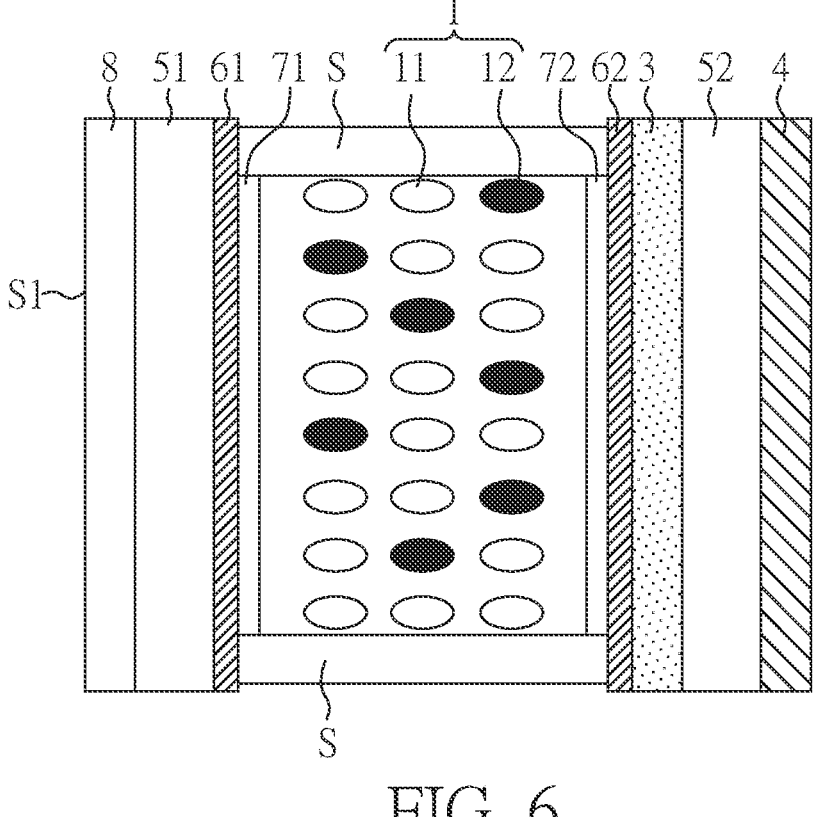
FIG. 6 is a schematic view of an electronic device according to one embodiment of the present disclosure.

FIG. 6 is a schematic view of an electronic device according to one embodiment of the present disclosure. The electronic device in FIG. 6 is similar to that in FIG. 5A, except for the following differences.

In one embodiment of the present disclosure, as shown in FIG. 6, the polarizer 3 may be disposed between the light modulation medium layer 1 and the second substrate 52. In one embodiment of the present disclosure, as shown in FIG. 6, the second substrate 52 may be disposed between the polarizer 3 and the reflective element 4. In one embodiment, the polarizer 3 may be disposed, for example, between the second electrode layer 62 and the second substrate 52, the polarizer 3 may, for example, comprise plural strip structures, and the material of the strip structures may comprise metallic materials (such as blackened metal) or other suitable non-transmitting materials; but the present disclosure is not limited thereto.

In one embodiment of the present disclosure, as shown in FIG. 6, the electronic device may further comprise an optical element 8 disposed at one side of the first substrate 51 away from the light modulation medium layer 1. More specifically, the optical element 8 is closer to the display side S1 of the electronic device than the light modulation medium layer 1. The optical element 8 may include an anti-glare layer, an anti-reflective layer or a combination thereof, thereby improving the glare of the electronic device. In the present disclosure, other components and materials of the electronic device in FIG. 6 can be as described above and will not be described again here.

Figure 7:
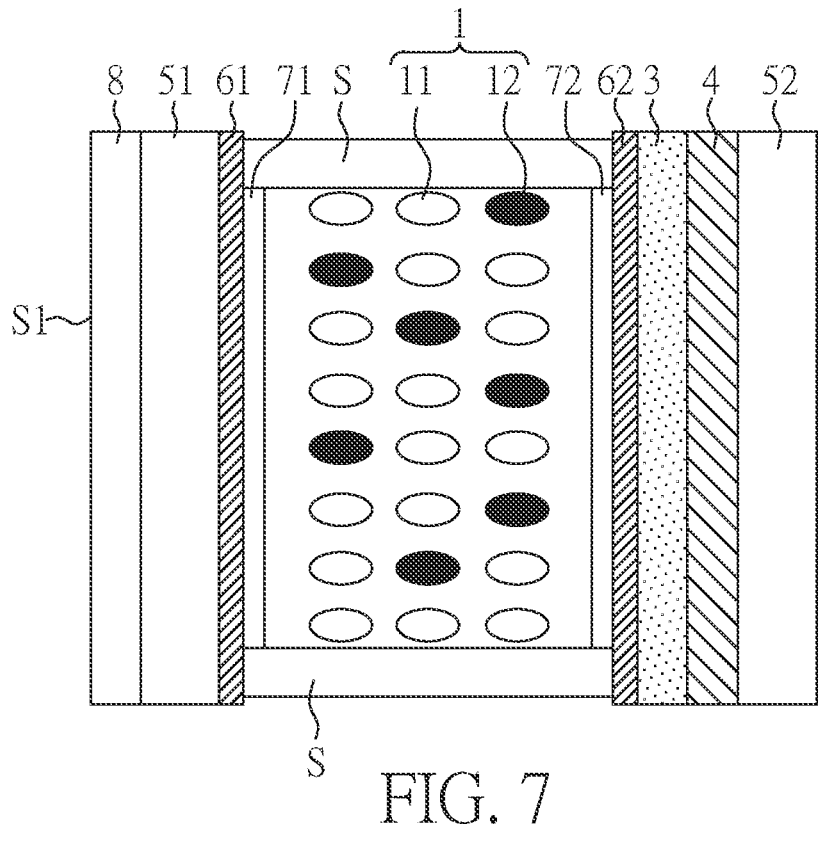
FIG. 7 is a schematic view of an electronic device according to one embodiment of the present disclosure.

FIG. 7 is a schematic view of an electronic device according to one embodiment of the present disclosure. The electronic device in FIG. 7 is similar to that in FIG. 5A, except for the following differences.

In one embodiment of the present disclosure, as shown in FIG. 7, the polarizer 3 and the reflective element 4 are adjacent to each other, and the polarizer 3 and the reflective element 4 may be disposed between the light modulation medium layer 1 and the second substrate 52. The above-mentioned the polarizer 3 and the reflective element 4 adjacent to each other are not limited to the two in contact to each other. The polarizer 3 and the reflective element 4 can be selectively separated by other light-transmitting material layers (a suitable material layer without phase retardation, that is, a suitable material with phase retardation close to 0).

In one embodiment of the present disclosure, as shown in FIG. 7, the electronic device may further comprise an optical element 8 disposed at one side of the first substrate 51 away from the light modulation medium layer 1. More specifically, the optical element 8 is closer to the display side S1 of the electronic device than the light modulation medium layer 1. The optical element 8 may comprise an anti-glare layer, an anti-reflective layer or a combination thereof, thereby improving the glare of the electronic device. In the present disclosure, other components and materials of the electronic device in FIG. 7 can be as described above and will not be described again here.

Figure 8:
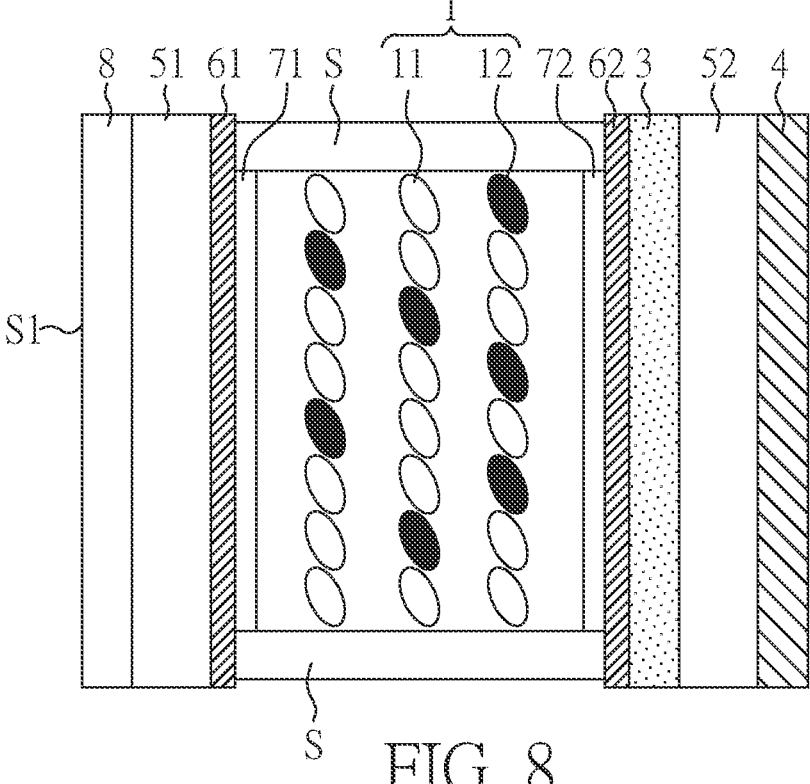
FIG. 8 is a schematic view of an electronic device according to one embodiment of the present disclosure.

FIG. 8 is a schematic view of an electronic device according to one embodiment of the present disclosure. The electronic device in FIG. 8 is similar to that in FIG. 5B, except for the following differences.

In one embodiment of the present disclosure, as shown in FIG. 8, the polarizer 3 may be disposed between the light modulation medium layer 1 and the second substrate 52, and the second substrate 52 may be disposed between the polarizer 3 and the reflective element 4.

In one embodiment of the present disclosure, as shown in FIG. 8, the electronic device may further comprise an optical element 8 disposed at one side of the first substrate 51 away from the light modulation medium layer 1. More specifically, the optical element 8 is closer to the display side S1 of the electronic device than the light modulation medium layer 1. The optical element 8 may comprise an anti-glare layer, an anti-reflective layer or a combination thereof, thereby improving the glare of the electronic device. In the present disclosure, as shown in FIG. 8, the first alignment layer 71 and the second alignment layer 72 are, for example, horizontally aligned respectively, and the liquid crystal material 11 can be, for example, a positive liquid crystal. When no voltage is applied to the first electrode layer 61 and the second electrode layer 62, the long axis direction of the liquid crystal material 11 and the long axis direction of the dye material 12 in the light modulation medium layer 1 can be approximately parallel to the surfaces of the first substrate 51 and the second substrate 52 respectively; but the present disclosure is not limited thereto. In other embodiments, the first alignment layer 71 and the second alignment layer 72 can also be vertically aligned respectively, and the liquid crystal material 11 can be a negative liquid crystal. When a voltage is applied to the first electrode layer 61 and the second electrode layer 62, the long axis direction of the liquid crystal material 11 and the long axis direction of the dye material 12 in the light modulation medium layer 1 can be approximately perpendicular to the first substrate 51 and the second substrate 52 respectively. In the present disclosure, other components and materials of the electronic device in FIG. 8 can be as described above and will not be described again here.

In one embodiment of the present disclosure, the materials of the first substrate 51, the second substrate 52 and the third substrate 53 are, for example, suitable materials without phase retardation, that is, suitable materials with phase retardation close to 0; but the present disclosure is not limited thereto. It should be noted that the electronic device in the above different embodiments can drive the light modulation medium layer 1 in a passive or active (i.e., using a driving transistor (not shown)) manner. It should be noted that, in the above different embodiments, the first electrode layer 61 and the second electrode layer 62 in the electronic device, for example, are whole surface layers, but the present disclosure is not limited thereto. The first electrode layer 61 and the second electrode layer 62 may be patterned into a plurality of parts. The plurality of parts of the first electrode layer 61 and the plurality of parts of the second electrode layer 62 (not shown), for example, overlap each other to form multiple overlapping regions (not shown). The light modulation medium layer 1 located in different overlapping regions can be selectively driven or undriven to achieve the effect of partition driving. It should be noted that the above-mentioned different components, such as the second substrate 52, the third substrate 53, the reflective polarizing element 2, the polarizer 3 and/or the reflective element 4, can be selectively fixed to each other through attachment members (not shown). It should be noted that other light-transmitting material layers (for example, a suitable material layer without phase retardation, that is, a suitable material layer with phase retardation close to 0) may be selectively disposed between the above-mentioned different elements, such as the second substrate 52, the third substrate 53, the reflective polarizing element 2, the polarizer 3 and/or the reflective element 4.

In the present disclosure, the electronic device can be applied to any electronic device that needs to be switched between the high reflective mode and the low reflective mode, thereby reducing the glare of the electronic device or improving the reaction rate. In the present disclosure, the electronic device can be applied to, for example, rearview mirrors for vehicles (or other transportation applications) or other suitable application products, but the present disclosure is not limited thereto.

The above specific examples are to be construed as illustrative only and not in any way limiting of the remainder of the disclosure.

Although the present disclosure has been explained in relation to its embodiment, it is to be understood that many other possible modifications and variations can be made without departing from the spirit and scope of the disclosure as hereinafter claimed.

The invention claimed is:

1. An electronic device applying to rearview mirrors for vehicles, comprising:

a light modulation medium layer comprising a liquid crystal material and a dye material;

a reflective element disposed opposite to the light modulation medium layer and away from a display side of the electronic device;

a reflective polarizing element disposed between the light modulation medium layer and the reflective element;

a polarizer disposed between the reflective polarizing element and the reflective element;

a first substrate disposed between the polarizer and the reflective element;

a second substrate disposed opposite to the first substrate; and a third substrate disposed between the first substrate and the second substrate, wherein the reflective polarizing element and the polarizer are disposed between the first substrate and the third substrate, wherein a first surface of the first substrate is directly in contact with the polarizer, and a second surface of the first substrate opposite to the first surface is directly in contact with the reflective element, wherein the reflective element has a reflectance of light with wavelengths ranging from 380 nm to 780 nm greater than or equal to 80%, wherein a first angle is included between a transmission axis of the reflective polarizing element and a transmission axis of the polarizer, and the first angle ranges from 10 degrees to 80 degrees or from 100 degrees to 170 degrees, wherein an incident light enters from the display side of the electronic device and is reflected by the reflective element.

2. The electronic device of claim 1, wherein the light modulation medium layer is disposed between the first substrate and the second substrate, wherein the electronic device can be switched between the high reflective mode and the low reflective mode; when the electronic device is switched to the low reflective mode, the light modulation medium layer has a first absorption axis, and a reflection axis of the reflective polarizing element is parallel to the first absorption axis; when the electronic device is switched to the high reflective mode, a long axis direction of the liquid crystal material and a long axis direction of the dye material in the light modulation medium layer are respectively perpendicular to a surface of the first substrate.

3. The electronic device of claim 1, further comprising an optical element, wherein the light modulation medium layer is disposed between the optical element and the reflective polarizing element.

4. The electronic device of claim 3, wherein the optical element comprises an anti-glare layer, an anti-reflective layer or a combination thereof.

5. The electronic device of claim 1, wherein the reflective polarizing element is disposed adjacent to the polarizer.

6. The electronic device of claim 1, wherein the light modulation medium layer is disposed between the third substrate and the second substrate, and the reflective polarizing element or the polarizer is disposed at one side of the third substrate away from the light modulation medium layer.

7. The electronic device of claim 6, wherein the reflective polarizing element or the polarizer is disposed between the second substrate and the first substrate.

8. The electronic device of claim 1, wherein the light modulation medium layer is disposed between the first substrate and the second substrate, and the reflective polarizing element and the polarizer are disposed between the light modulation medium layer and the first substrate.

9. The electronic device of claim 8, wherein the reflective polarizing element is disposed adjacent to the polarizer.

10. The electronic device of claim 1, further comprising:

an electrode layer disposed between the light modulation medium layer and the reflective polarizing element; and an insulating layer disposed between the electrode layer and the reflective polarizing element, wherein a material of the insulating layer comprises a transparent insulating material.

11. The electronic device of claim 1, wherein the first substrate is a single layer.

12. An electronic device applying to rearview mirrors for vehicles, comprising:

a light modulation medium layer comprising a liquid crystal material and a dye material;

a reflective element disposed opposite to the light modulation medium layer and away from a display side of the electronic device;

a polarizer disposed between the light modulation medium layer and the reflective element, wherein the polarizer is directly in contact with the reflective element;

a first substrate disposed between the polarizer and the light modulation medium layer;

a second substrate disposed opposite to the first substrate; and an electrode layer disposed between the light modulation medium layer and the first substrate, wherein the first substrate comprising a first surface and a second surface opposite to the first surface, the first surface of the first substrate is directly in contact with the electrode layer, and the second surface of the first substrate is directly in contact with the polarizer, wherein the light modulation medium layer is disposed between the first substrate and the second substrate, wherein the reflective element has a reflectance of light with wavelengths ranging from 380 nm to 780 nm greater than or equal to 80%, wherein when the electronic device is switched to a low reflective mode, the light modulation medium layer has a first absorption axis, and an angle included between the first absorption axis and a second absorption axis of the polarizer ranges from 80 degrees to 100 degrees, wherein an incident light enters from the display side of the electronic device and is reflected by the reflective element.

13. The electronic device of claim 12, wherein when the electronic device is switched to a high reflective mode, a long axis direction of the liquid crystal material and a long axis direction of the dye material in the light modulation medium layer are respectively perpendicular to a surface of the first substrate.

14. The electronic device of claim 12, wherein the first substrate is disposed between the light modulation medium layer and the reflective element.

15. The electronic device of claim 12, further comprising: an optical element disposed at one side of the second substrate away from the light modulation medium layer.

16. The electronic device of claim 15, wherein the optical element comprises an anti-glare layer, an anti-reflective layer or a combination thereof.

* * * * *